United States Patent
Bonin et al.

(10) Patent No.: US 9,242,904 B2
(45) Date of Patent: Jan. 26, 2016

(54) AQUEOUS PREPARATIONS OF POLYMER-MODIFIED SETTING ACCELERATORS, AND USE THEREOF IN THE CONSTRUCTION INDUSTRY

(75) Inventors: Klaus Bonin, Burghausen (DE); Harald Zeh, Burghausen (DE)

(73) Assignee: Wacker Chemie AG, Munich (DE)

( * ) Notice: Subject to any disclaimer, the term of this patent is extended or adjusted under 35 U.S.C. 154(b) by 1015 days.

(21) Appl. No.: 12/599,982

(22) PCT Filed: May 15, 2008

(86) PCT No.: PCT/EP2008/055958
§ 371 (c)(1),
(2), (4) Date: Nov. 13, 2009

(87) PCT Pub. No.: WO2008/145531
PCT Pub. Date: Dec. 4, 2008

(65) Prior Publication Data
US 2010/0303549 A1    Dec. 2, 2010

(30) Foreign Application Priority Data
May 30, 2007  (DE) .......................... 10 2007 024 965

(51) Int. Cl.
*C04B 24/26* (2006.01)
*C04B 40/00* (2006.01)
*C04B 103/12* (2006.01)
*C04B 111/00* (2006.01)

(52) U.S. Cl.
CPC .......... *C04B 40/0039* (2013.01); *C04B 2103/12* (2013.01); *C04B 2111/00663* (2013.01); *C04B 2111/00732* (2013.01)

(58) Field of Classification Search
CPC .... C04B 12/04; C04B 14/303; C04B 22/062; C04B 22/10; C04B 24/2652; C04B 2103/404; C04B 2111/00663; C04B 2111/00732

USPC .......................................................... 524/2–9
See application file for complete search history.

(56) References Cited

U.S. PATENT DOCUMENTS

| | | | |
|---|---|---|---|
| 3,931,096 A | 1/1976 | Guilbault et al. | |
| 5,229,019 A * | 7/1993 | Forrest | 106/406 |
| 6,395,853 B1 * | 5/2002 | Oswald et al. | 526/307.2 |
| 2005/0194323 A1* | 9/2005 | Ruth et al. | 210/723 |
| 2007/0037925 A1* | 2/2007 | Weitzel et al. | 524/563 |
| 2009/0030168 A1 | 1/2009 | Schorm et al. | |

FOREIGN PATENT DOCUMENTS

| | | |
|---|---|---|
| DE | 2011150 | 9/1971 |
| DE | 2548688 | 5/1977 |
| DE | 102006007282 | 8/2007 |
| EP | 0812812 | 12/1997 |
| EP | 1984428 B1 | 10/2008 |
| JP | 57166351 A | 10/1982 |
| JP | 2006045010 A | 2/2006 |
| WO | 0005275 A1 | 2/2000 |
| WO | 0005276 A1 | 2/2000 |
| WO | 2007093551 A1 | 8/2007 |

OTHER PUBLICATIONS

Flick, Ernest W.' "Water-Soluble Resins" An Industrial Guide, Second Edition; Book; 1991; Noyes Publications, Park Ridge; NJ, USA.
Fox, T. G.; #J5—"Influence of Diluent and of Copolymer Composition on the Glass Temperature of a Polymer System"; Bulletin American Physics Society; vol. 1; 1956; p. 123 (1 p).
Lee, W. A. & Rutherford, R. A.; "The Glass Transition Temperatures of Polymers"; Polymer Handbook, 2$^{nd}$ Edition; 1975; 53 pp.; J. Wiley & Sons, New York.
Pollio, Marco; "International Search Report"; Nov. 14, 2008; 2 pp; European Patent Office, Rijswik, The Netherlands.

* cited by examiner

*Primary Examiner* — Peter D Mulcahy
(74) *Attorney, Agent, or Firm* — RatnerPrestia

(57) ABSTRACT

The invention relates to aqueous preparations of polymer-modified setting accelerators, said preparations being characterized in that at least one setting accelerator and at least one cationically stabilized polymer are contained therein.

16 Claims, No Drawings

AQUEOUS PREPARATIONS OF POLYMER-MODIFIED SETTING ACCELERATORS, AND USE THEREOF IN THE CONSTRUCTION INDUSTRY

CROSS REFERENCE TO RELATED APPLICATIONS

This is a U.S. National Phase application of PCT application number PCT/EP2008/055958, filed May 15, 2008, which claims priority benefit of German application number DE 10 2007 024 965.0 (filed May 30, 2007), the content of such applications being incorporated herein by reference.

FIELD OF THE INVENTION

The invention relates to aqueous preparations of polymer-modified setting accelerators, a process for producing them and also aqueous concrete compositions containing aqueous preparations of the polymer-modified setting accelerators, a process for producing them and their use, for example in civil engineering, mining or tunnel construction.

BACKGROUND OF THE INVENTION

A customary process for producing and processing aqueous concrete compositions is the dry spray concrete process, in which dry concrete mixes are made up with water directly on the construction site. In the dry spray concrete process, the dry concrete mix is conveyed, for example pneumatically, through a transport line to a spray nozzle and made up with water and, if appropriate, mixed with further additives in the spray nozzle. The concrete compositions are thus sprayed onto a substrate by means of the spray nozzle immediately after making up with water. Dry concrete mixes comprise cement, fillers such as sand or gravel and, if appropriate, setting accelerators and polymers and also further additives. The addition of polymers enables the processability of concrete compositions or the property profile of concrete to be improved, for example its adhesion to various substrates, gas permeability, E modulus, or hydrophobicization of the concrete can be achieved. Setting accelerators such as aluminum sulfate considerably accelerate the curing of aqueous concrete compositions and thereby produce better resistance to sagging of the aqueous concrete compositions on their substrate. This simplifies the processing of aqueous concrete compositions and makes vertical or overhead processing possible. Depending on requirements, stiffening times of from a number of minutes to a few seconds can be set by appropriate use of setting accelerators.

The dry spray concrete process is particularly useful when using relatively small amounts of concrete compositions, as is frequently the case, for example, in the renovation of building works.

However, a fundamental problem is that aqueous concrete compositions having different contents of setting accelerators and polymers are frequently required in different construction sections of the same construction site. The required adaptation of the composition of the aqueous concrete compositions has, however, hitherto not been possible in a practicable and economical way. Previously known compositions containing setting accelerators and polymers are storage-stable only in dry form. However, the entire dry concrete mix would have to be mixed on addition of polymers or setting accelerators, which would be associated with a large outlay in terms of time, apparatus and logistics. It would be more efficient to mix setting accelerators and polymers into the water with which the dry concrete mixes are made up in the spray nozzle. However, this is not possible since previously known setting accelerators and polymers immediately coagulate and flocculate in aqueous form and therefore have to be applied immediately after mixing without a further intermediate step; i.e. mixing of setting accelerators and polymers could hitherto only be carried out in aqueous concrete compositions and this in turn only immediately before application to a substrate.

Overall, the dry spray concrete process is thus not very flexible in respect of the production of aqueous concrete compositions containing variable amounts of setting accelerators and polymers. Furthermore, a large amount of dust is produced in the handling of dry concrete mixes, and this has an adverse effect on the health of the workers on the construction site and makes complicated safety precautions necessary.

The use of wet concrete mixes, in particular using the wet spray concrete process, is also widespread. Wet concrete mixes comprise cement, fillers such as sand or gravel and, if appropriate, polymers and further additives and have already been made up with water. In the wet spray concrete process, setting accelerators are added to the wet concrete mixes in the spray nozzle, i.e. immediately before application to the respective substrate. It is advantageous that the water content, the consistency and thus the quality of the wet spray concrete can be set precisely when using the wet spray concrete process. The wet spray concrete process is particularly suitable when relatively large amounts of concrete compositions are employed, as is the case, for example, in tunnel construction.

However, the wet spray concrete process also has the disadvantage that the amount of polymers in the wet concrete mixes cannot be varied on the construction site without a further, complicated mixing step. This is because on addition of polymers to a wet concrete mix, the entire wet concrete mix would have to be mixed, which in view of the large quantities of aqueous concrete compositions to be processed would be associated with a considerable outlay in terms of time and apparatus and additionally represent a considerable change to the established logistics on a construction site.

SUMMARY OF THE INVENTION

In view of this background, it was an object of the invention to provide compositions and processes by means of which setting accelerators and polymers can be added as desired to the aqueous concrete compositions on the construction site in a flexible and economical way.

It has surprisingly been found that aqueous compositions containing setting accelerators and cationically stabilized polymers are stable and do not coagulate or precipitate.

The invention provides aqueous preparations of polymer-modified setting accelerators, characterized in that one or more setting accelerators and one or more cationically stabilized polymers are present.

DETAILED DESCRIPTION OF THE INVENTION

The setting accelerators known to those skilled in the art, for example aluminum compounds, silicates, alkali metal hydroxides or carbonates, are suitable for the aqueous preparations of the polymer-modified setting accelerators. Preferred setting accelerators are aluminum salts, aluminates, alkali metal silicates, for example water glass, alkali metal carbonates or potassium hydroxide. Particularly preferred setting accelerators are aluminum sulfate, alkali metal aluminates such as potassium aluminate, aluminum hydroxides, potassium carbonate or sulfoaluminates such as calcium sulfoaluminate.

Cationically stabilized polymers comprise one or more cationic protective colloids, one or more polymers based on ethylenically unsaturated monomers (base polymer) and, if appropriate, nonionic protective colloids and/or nonionic emulsifiers.

Suitable cationic protective colloids are polymers having a cationic charge. Such polymers are described, for example, in E. W. Flick, Water-Soluble Resins—an Industrial Guide, Noyes Publications, Park Ridge, N.J., 1991. Preference is given to polymers which contain cationic monomer units, particularly preferably monomer units having quaternary ammonium groups, sulfonium groups and phosphonium groups. Most preferred are homopolymers or copolymers of one or more cationic monomers from the group consisting of diallyldimethylammonium chloride (DADMAC), diallyldiethylammonium chloride (DADEAC), (3-methacryloxy)propyltrimethylammonium chloride (MPTAC), (3-methacryloxy)ethyltrimethylammonium chloride (METAC), (3-methacrylamido)propyltrimethylammonium chloride (MAPTAC), 2-dimethylaminoethyl methacrylate and 3-dimethylaminopropylmethacrylamide (DMAEMA) or DMAPMA species protinated at pH ≤5).

In general, the cationic protective colloids contain from 20 to 100% by weight, preferably from 50 to 100% by weight, particularly preferably 100% by weight, of cationic monomer units, based on the total weight of the cationic protective colloid. Suitable nonionic, copolymerizable monomers are vinyl esters having from 1 to 15 carbon atoms in the carboxylic acid radical, e.g. vinyl acetate, vinyl propionate, vinyl dodecanoate; acrylamide, hydroxyethyl (meth)acrylate, hydroxypropyl (meth)acrylate, esters of methacrylic acid and acrylic acid with alcohols having from 4 to 13 carbon atoms, polyalkylene glycol (meth)acrylates having $C_2$-$C_4$-alkylene units and molecular weights of from 350 to 2000 g/mol and also N-vinylpyrrolidone, N-vinylcaprolactam, acryloxypropyltrialkoxysilanes and methacryloxypropyltrialkoxysilanes, vinyltrialkoxysilanes and vinylmethyldialkoxysilanes and/or mixtures of the abovementioned nonionic comonomers.

Preference is given to cationic protective colloids having a K value (determined by a method based on DIN 53726, 1% by weight in water, 25° C., Ubbelohde viscometer) of from 10 to 250, particularly preferably from 25 to 130. The modification to DIN 53726, the standard for determination of the viscosity of PVC in an Ubbelohde viscometer, is the use of water instead of cyclohexanone as solvent. The Höppler viscosity of the cationic protective colloids is from 1 to 50 mPas, preferably from 1 to 25 mPas, most preferably from 1 to 15 mPas (in each case determined by the Höppler method at 20° C. in accordance with DIN 53015).

The preparation of cationic protective colloids is known, for example, from DE-A 102006007282 and can be carried out, for example, by free-radical polymerization in aqueous solution, in solvent mixtures or in the presence of salts, for example also in a precipitation polymerization, for example by polymer-analogs reaction in solution or solvent mixtures, for example in suspension or, for example, by inverse emulsion polymerization.

Monomers suitable for preparing the base polymer are vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having from 9 to 13 carbon atoms, for example VeoVa9® or VeoVa10® (trade names of Shell). Particular preference is given to vinyl acetate. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate. Examples of olefins and dienes are ethylene, propylene and 1,3-butadiene. Suitable vinylaromatics are styrene and vinyltoluene. A suitable vinyl halide is vinyl chloride.

If appropriate, from 0.05 to 50% by weight, preferably from 1 to 10% by weight, based on the total weight of the base polymer, of auxiliary monomers can additionally be copolymerized. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carboxylic nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids or salts thereof, preferably vinylsulfonic acid, 2-acrylamido-2-methylpropanesulfonic acid. Further examples are precrosslinking comonomers such as multiply ethylenically unsaturated comonomers, for example divinyl adipate, diallyl maleate, allyl methacrylate or triallyl cyanurate, or postcrosslinking comonomers, for example acrylamidoglycolic acid (AGA), methyl methylacrylamidoglycolate (MMAG), N-methylolacrylamide (NMA), N-methylolmethacrylamide (NMMA), N-methylolallyl carbamate, alkyl ethers such as the isobutoxy ether or ester of N-methylolacrylamide, of N-methylolmethacrylamide and of N-methylolallyl carbamate. Further suitable auxiliary monomers are epoxide-functional comonomers such as glycidyl methacrylate and glycidyl acrylate. Further examples are silicon-functional comonomers such as acryloxypropyltri(alkoxy)silanes and methacryloxypropyltri(alkoxy)silanes, vinyltrialkoxysilanes and vinylmethyldialkoxysilanes, in which methoxy, ethoxy and ethoxypropylene glycol ether radicals, for example, can be present as alkoxy groups. Mention may also be made of monomers having hydroxy or CO groups, for example hydroxyalkyl esters of methacrylic acid and acrylic acid, e.g. hydroxyethyl, hydroxypropyl or hydroxybutyl acrylate or methacrylate, and also compounds such as diacetoneacrylamide and acetylacetoxyethyl acrylate or methacrylate. Further suitable comonomers are vinyl alkyl ethers, for example vinyl methyl ether, vinyl ethyl ether, vinyl isobutyl ether, vinyl octadecyl ether.

Examples of homopolymers and copolymers suitable as base polymer are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styene-1,3-butadiene copolymers.

Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having from 1 to 15 carbon atoms in the carboxylic acid radical, e.g. vinyl propionate, vinyl dodecanoate, vinyl esters of alpha-branched carboxylic acids having from 9 to 13 carbon atoms, e.g. VeoVa9®, VeoVa10®, VeoVa11®; copolymers of vinyl acetate, from 1 to 40% by weight of ethylene and preferably from 1 to 60% by weight of acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or vinyl esters of an alpha-branched carboxylic acid having from 9 to 13 carbon atoms and from 1 to 30% by weight of acrylic esters of unbranched or branched alcohols having from 1 to 15 carbon atoms, in particular n-butyl acrylate or 2-ethylhexyl acrylate, which additionally contain from 1 to 40% by weight of ethylene; copolymers comprising vinyl acetate, from 1 to 40% by weight of ethylene and from 1 to 60% by weight of vinyl chloride; where the polymers can additionally contain the auxiliary monomers mentioned in the amounts mentioned and the figures in % by weight in each case add up to 100% by weight.

Preference is also given to (meth)acrylic ester polymers such as copolymers of n-butyl acrylate or 2-ethylhexyl acrylate or copolymers of methyl methacrylate with nbutyl acrylate and/or 2-ethylhexyl acrylate and, if appropriate, ethylene; styrene-(meth)acrylic ester copolymers comprising one or more monomers from the group consisting of methyl acrylate, ethyl acrylate, propyl acrylate, n-butyl acrylate, 2-ethylhexyl acrylate; vinyl acetate-(meth)acrylic ester copolymers comprising one or more monomers from the group consisting of methyl acrylate, ethyl acrylate, propyl acrylate, n-butyl acrylate, 2-ethylhexyl acrylate and, if appropriate, ethylene; styrene-1,3-butadiene copolymers; where the polymers can additionally contain the auxiliary monomers mentioned in the amounts mentioned and the figures in % by weight in each case add up to 100% by weight.

The choice of monomers or the choice of the proportions by weight of the comonomers is made in such a way that, in general, a glass transition temperature Tg of from −50° C. to +50° C., preferably from −30° C. to +10° C., results. The glass transition temperature Tg of the polymers can be determined in a known way by means of differential scanning calorimetry (DSC). The Tg can also be calculated approximately beforehand by means of the Fox equation. According to Fox T. G., Bull. Am. Physics Soc. 1, 3, page 123 (1956): $1/Tg=x1/Tg1+x2/Tg2+ \ldots + xn/Tgn$, where xn is the mass fraction (% by weight/100) of the monomer n and Tgn is the glass transition temperature in kelvin of the homopolymer of the monomer n. Tg values for homopolymers are given in the Polymer Handbook 2nd Edition, J. Wiley & Sons, New York (1975).

The base polymers are prepared in an aqueous medium, preferably by the emulsion polymerization process as described, for example, in DE-A 102006007282. The base polymers are obtained in the form of aqueous dispersions and can be converted into corresponding powders which are redispersible in water by customary drying processes.

The preparation of cationically stabilized polymers which are redispersible in water is carried out, for example, by the method known from DE-A 102006007282 by drying aqueous dispersions of the base polymer, with the cationic protective colloids being able to be added before, during or after drying. The cationic protective colloids can also be used in combination with nonionic protective colloids or in combination with nonionic emulsifiers. Suitable nonionic protective colloids are, for example, polyvinyl alcohols, polyvinyl acetals, polyvinylpyrrolidones, polysaccharides in water-soluble form, e.g. starches (amylose and amylopectin), celluloses and their methyl, hydroxyethyl, hydroxypropyl derivates, poly(meth) acrylamide. Suitable nonionic emulsifiers are, for example, surfactants such as alkylpolyglycol ethers or alkylarylpolyglycol ethers having from 8 to 40 alkylene oxide units.

To produce cationically stabilized polymers dispersed in water, it is possible, for example, to mix aqueous dispersions of base polymers with cationic protective colloids. Cationically stabilized polymers dispersed in water can also be obtained by redispersing cationically stabilized polymers which can be redispersed in water by means of water.

The cationically stabilized polymer contains a total amount of from 0.1 to 20% by weight, preferably from 1 to 12% by weight, of the cationic protective colloid, if appropriate in combination with a nonionic protective colloid and/or nonionic emulsifier, in each case based on the polymeric constituents of the cationically stabilized polymers. Cationically stabilized polymers in the form of aqueous dispersions have a solids content of preferably from 10 to 75% by weight, particularly preferably from 40 to 60% by weight.

The invention further provides a process for producing the aqueous preparations of the polymer-modified setting accelerators, characterized in that one or more setting accelerators and one or more cationically stabilized polymers are mixed in the presence of water.

The setting accelerators can be used in any form for producing the aqueous preparations of the polymer-modified setting accelerators; i.e. the setting accelerators can, for example, be used in solid or liquid form or as aqueous solution, aqueous emulsion or aqueous dispersion. The cationically stabilized polymers are used as aqueous dispersions or as pulverulent polymers.

Aqueous preparations of the polymer-modified setting accelerators can be produced, for example, by dispersing pulverulent cationically stabilized polymers in aqueous preparations of setting accelerators, for example dispersions or solutions. It is likewise possible to mix pulverulent cationically stabilized polymers with pulverulent setting accelerators to give dry mixes and to mix these with water at a later point in time to give the aqueous preparations of the polymer-modified setting accelerators. Aqueous preparations of the polymer-modified setting accelerators are preferably produced by mixing aqueous dispersions of cationically stabilized polymers with setting accelerators and if appropriate drying these to give powders which can be mixed again with water at a later point in time, for example on the construction site.

The content of setting accelerators and cationically stabilized polymers in the aqueous preparations of the polymer-modified setting accelerators is preferably from 10 to 75% by weight, particularly preferably from 30 to 65% by weight and most preferably from 40 to 60% by weight, based on the total weight of the aqueous preparations of the polymer-modified setting accelerators.

The setting accelerators and the cationically stabilized polymers can be present in any ratios in the aqueous preparations of the polymer-modified setting accelerators. The weight ratio of cationically stabilized polymers to setting accelerators is preferably from 5:1 to 1:5, particularly preferably from 2:1 to 1:2 and most preferably 1:1, in each case based on the dry weight of the aqueous preparations of the polymer-modified setting accelerators. The aqueous preparations of polymer-modified setting accelerators are characterized in that they are stable and do not coagulate or precipitate in any mixing ratios even after days and weeks.

The aqueous preparations of the polymer-modified setting accelerators are suitable for use in hydraulically setting systems, for example in concrete, mortars, for example in screeds or plasters and renders, and also paints. A preferred field of use for the aqueous preparations of the polymer-modified setting accelerators is use in concrete according to the dry spray concrete process and the wet spray concrete process.

The invention further provides aqueous concrete compositions comprising cement, fillers and, if appropriate, further auxiliaries or additives, characterized in that an aqueous preparation of the polymer-modified setting accelerators is present.

Typical formulations for the aqueous concrete compositions contain from 9 to 30% by weight, in particular from 15 to 25% by weight, of cement, for example portland cement or blast furnace cement, preferably portland cement CEM I 42.5, portland cement CEM I 52.5, portland silica dust cement CEM II A-D 52.5 or blast furnace cement CEM III 42.5 A. Setting accelerators are used in an amount of from 3 to 8% by weight, based on the cement content of the aqueous concrete composition. Preference is given to using aqueous setting accelerators, preferably with a solids content of from 10 to 75% by weight, particularly preferably from 30 to 60% by weight and most preferably from 40 to 60% by weight. Cationically stabilized polymers are used in an amount of from 0.1 to 5.0% by weight, preferably from 0.2 to 2.0% by weight, particularly preferably from 0.5 to 1.5% by weight, with the cationically stabilized polymers preferably being present in the form of cationically stabilized polymers dispersed in water at a solids content of from 10 to 75% by weight, particularly preferably from 40 to 60% by weight. A further constituent is from 65 to 90% by weight, preferably from 75 to 90% by weight, of fillers such as sand or gravel. Unless indicated otherwise, the figures in % by weight are in each case based on 100% by weight of dry mass of the formulation. To produce the aqueous concrete compositions, from 20 to 60% by weight, preferably from 25 to 40% by weight, of water, based on the total amount of the cement used, is used.

The use properties of the aqueous concrete compositions can be improved by means of further auxiliaries. Auxiliaries present in preferred embodiments of the aqueous concrete compositions are, for example, pigments, foam stabilizers, hydrophobicizing agents, plasticizers, fly ash, disperse silica, fluidizers, air porosity agents to control the bulk density of the concrete or pumping aids to improve the pumpability. Furthermore, additives which modulate the setting-accelerating effect of the setting accelerators on the aqueous concrete compositions, for example phosphoric acid, phosphonic acid, polyphosphate, polyhydroxycarboxylic acid or organic additives, in particular polyacrylic acid, hexamethylenetetramine, alkanolamines such as diethanolamine (DEA) or triethanolamine, can, if appropriate, be added to the aqueous concrete compositions.

The invention further provides a process for producing the aqueous concrete composition by mixing of cement, fillers and, if appropriate, further auxiliaries or additives, characterized in that at least one aqueous preparation of the polymer-modified setting accelerators is added.

The aqueous concrete compositions can, for example, be produced from dry concrete mixes or wet concrete mixes. Mixing of the constituents of the formulation for producing the aqueous concrete compositions is not tied to any particular mixing apparatus or procedure and can, for example, be carried out in a concrete mixer or a ready-mixed concrete apparatus.

In the preferred process for producing the aqueous concrete composition, the aqueous preparations of the polymer-modified setting accelerators are mixed with the further components of the aqueous concrete composition in the spray nozzle in the wet spray concrete process or the dry spray concrete process. Particular preference is given to use in the wet spray concrete process. The apparatuses known for spray concrete processes, for example spraying robots or spraying machines, can be used.

When the process of the invention is employed, the aqueous preparations of the polymer-modified setting accelerators are advantageously delivered directly to the construction site, so that no time-consuming dispersing or dissolution and mixing of the setting accelerators and cationically stabilized polymers has to be carried out at the construction site. In addition, the mixing of the aqueous preparations of the polymer-modified setting accelerators with the further components of the aqueous concrete composition can be carried out by the wet spray concrete process or the dry spray concrete process using customary apparatuses and the established construction site logistics. In the procedure according to aspects of the invention, a concrete mix having the same composition comprising cement, fillers and, if appropriate, further auxiliaries and additives can be used for the entire construction project and cationically stabilized polymers and setting accelerators can be added in the required amount to this concrete mix according to the requirements of each section of the construction during processing on the construction site.

The aqueous concrete compositions of the invention also have advantageous use properties compared to conventional concrete compositions. Thus, the aqueous concrete compositions have, especially after a short setting time (1 to 2 days), increased compressive strength compared to conventional concrete compositions.

The present invention further provides a process for producing a concrete composite, characterized in that one or more layers of the aqueous concrete compositions are applied on top of one another, with components being able, if appropriate, to be installed between or in the layers.

Suitable construction elements are, for example, steel, water-impermeable films, preferably PE- or PVC-containing films, or water-impermeable membranes. Water-impermeable membranes comprise polymers and cement components and are also known to those skilled in the art under the name TSL (thin sprayable liner).

The process for producing a concrete composite can be employed in all conventional applications of concrete in building and construction. In particular, the process is suitable of use in civil engineering, for surface sealing, for strengthening of embankments or for securing boulders or rock.

Civil engineering encompasses any type of constructions such as buildings, shafts, supply routes, bridges, floor slabs or preferably tunnels or mines. To produce constructions, the shuttering construction method, the use of prefabricated concrete components or preferably the spray concrete process are employed. Prefabricated components can be obtained by introducing aqueous concrete compositions into molds which are removed after setting of the aqueous concrete compositions.

To produce the concrete composite by the spray concrete process, the aqueous concrete compositions are preferably applied directly to the substrate which may, if appropriate, be reinforced with steel. The applied layer thickness is usually in the range from 10 to 40 cm. Particularly in the production of relatively thick concrete layers, it is advantageous to apply the aqueous concrete compositions in a plurality of superimposed layers which each have a lower concrete layer thickness. It can likewise be preferred to produce a concrete composite by filling the remaining space between a substrate and a prefabricated component with aqueous concrete compositions, with steel reinforcement being able, if appropriate, to be installed in order to increase the stability of the composite.

In a further preferred process for producing a concrete composite, water-impermeable films or water-impermeable membranes are installed between a component and a layer of an aqueous concrete composition or between two layers of aqueous concrete compositions, each of which may, independently of one another, be reinforced with steel.

The following examples serve to illustrate the invention in detail and are not to be construed as a restriction.

Production of the aqueous preparations of the polymer-modified setting accelerators:

Example 1

The aqueous preparations of the polymer-modified setting accelerators were produced by introducing an aqueous dispersion of aluminum sulfate (SC=50%) (BE) under standard conditions in accordance with DIN50014 and while stirring by means of an Ultraturrax stirrer into an aqueous dispersion of the cationic polymer (SC=50%) (KatPol) in the ratios a to e) indicated in table 1 and stirring the mixture for 5.0 minutes.

As aqueous dispersion of the cationic polymer, use was made of a vinyl acetate-ethylene copolymer dispersion which had a solids content of 50% by weight and a Tg of −5° C. and had been produced in the presence of 10% by weight of polytrimethylammoniopropylmethacrylamide chloride, based on the mass of the vinyl acetate and ethylene monomers used.

Comparative Example 1 (CEx. 1)

As a difference from example 1, an aqueous polymer dispersion of a polyvinyl alcohol-stabilized vinyl acetate-ethylene copolymer having a Tg of −7° C. (SC=50%) (VPol) was used instead of the aqueous dispersion of the cationic polymer.

TABLE 1

Evaluation of the storage stability:

|  | Example 1 | | | | | CEx. 1 |
| --- | --- | --- | --- | --- | --- | --- |
|  | a | b | c | d | e |  |
| Percent by volume of KatPol [%] | 70 | 60 | 50 | 40 | 30 | — |
| Percent by volume of VPol [%] | — | — | — | — | — | 50 |
| Percent by volume of BE [%] | 30 | 40 | 50 | 60 | 70 | 50 |
| Storage stability after 1 hour | A | A | A | A | A | C |
| Storage stability after 1 day | A | A | A | A | A | C |
| Storage stability after 28 days | A | A | A | A | A | C |

The evaluation of the storage stability of the aqueous preparations of the polymer-modified setting accelerators was carried out visually according to the following scale:
A = stable dispersion; no thickening or coagulation
B = thickening and coagulation
C = spontaneous and complete thickening and coagulation in the production of the aqueous preparations of the polymer-modified setting accelerators It can be seen from table 1 that the aqueous preparations of the polymer-modified setting accelerators according to aspects of the invention (example 1) are stable throughout the entire range of observations regardless of their composition and no coagulation or precipitation occurs. In contrast, the composition examined in comparative example 1 coagulated immediately on addition of the setting accelerator to the polymer dispersion, so that a thickened mass having the consistency of cottage cheese was formed.

Production of Aqueous Concrete Compositions

Example 2

Water, sand, gravel and portland cement CEM I 42.5 were mixed uniformly in the amounts listed below in a 100 l concrete mixer (Zyklos Z 75 corotating mechanical mixer) by stirring for 2 minutes. After allowing the mixture to stand for 8 minutes, it was stirred for another 1 minute and during this time admixed with the indicated amount of melamine-sulfonate-formaldehyde condensate.

The aqueous preparations of the polymer-modified setting accelerators were produced by introducing an aqueous dispersion of aluminum sulfate into the cationic polymer dispersed in water in the amounts indicated below while stirring with an Ultraturrax stirrer and under standard conditions in accordance with DIN50014 and stirring the mixture for 5 minutes.

The aqueous concrete composition was produced by mixing the aqueous preparation of the polymer-modified setting accelerator into the wet concrete mix in the spray nozzle (wet spray nozzle NW 50 from Mayco) using the wet spraying technology. The aqueous concrete composition was poured under standard conditions by means of the spray nozzle into shuttering (length/height/width=70 cm/40 cm/70 cm). After storage for 24 hours under standard conditions in accordance DIN50014, cylindrical drill cores having a base diameter of 200 mm and a height of 100 mm were taken and stored for the test time in accordance with DIN EN 196. The drill cores were subsequently subjected to use testing.

Wet Concrete Mix:

| | |
| --- | --- |
| 962 kg | of sand (up to 4.0 mm particle diameter) |
| 643 kg | of gravel (4.0 to 8.0 mm particle diameter) |
| 450 kg | of portland cement CEM I 42.5 |
| 0.23 kg | of melaminesulfonate-formaldehyde condensate (plasticizer) (Sika Addiment FM/F from Sika) |
| 136 kg | of water |

Aqueous Preparation of the Polymer-Modified Setting Accelerator:

| | |
| --- | --- |
| 45 kg | of an aqueous dispersion of aluminum sulfate (SC = 50) |
| 45 kg | of the cationically stabilized polymer dispersed in water from example 1 (SC = 50) |

Comparative Example 2 (CEx. 2)

As a difference from example 2, the wet concrete mix was made up with 146 kg of water. 45 kg of an aqueous dispersion (SC=50%) of a polyvinyl alcohol-stabilized vinyl acetate-ethylene copolymer having a Tg of −7° C. and 45 kg of an aqueous dispersion (SC=50%) of aluminum sulfate were used instead of the aqueous preparation of the polymer-modified setting accelerator from example 2.

Comparative Example 3 (CEx. 3)

As a difference from example 2, the wet concrete mix was made up with 156 kg of water. No cationically stabilized polymer dispersed in water was used.

Use Testing:

Compressive Strength of Set Aqueous Concrete Compositions:

The drill cores from example 2 and from comparative examples 2 and 3 were tested to determine their compressive strength in accordance with DIN EN 196.

TABLE 2

Examination of the compressive strength of set aqueous concrete compositions:

| Age of the drill cores [days] | Compressive strengths of the drill cores [N/mm$^2$] | | |
|---|---|---|---|
| | Example 2 | CEx. 2 | CEx. 3 |
| 1 | 19.5 | 11.8 | 11.8 |
| 3 | 30.2 | 29.5 | 24.7 |
| 7 | 43.9 | 39.7 | 36.8 |
| 28 | 55.6 | 54.3 | 49.0 |
| 56 | 58.5 | 56.2 | 52.8 |

The aqueous preparations of the polymer-modified setting accelerators bring about an increase in the compressive strengths of set, aqueous concrete compositions (example 2) compared to conventional set concrete compositions (comparative examples 2 and 3). In particular, the set, aqueous concrete compositions according to aspects of the invention have an increased early strength.

The invention claimed is:

1. An aqueous preparation of polymer-modified setting accelerators, comprising:
    a setting accelerator, wherein the setting accelerator is one of aluminum compounds, silicates, alkali metal hydroxides or alkali carbonates; and
    a cationically stabilized colloid comprising one or more cationic protective colloids and one or more polymers of ethylenically unsaturated monomers, wherein the polymers of ethylenically unsaturated monomers are colloidally stabilized by the one or more cationic protective colloids, wherein the cationic protective colloids are polymeric.

2. A process for producing the aqueous preparation of claim 1, comprising mixing the setting accelerator and the cationically stabilized polymer in the presence of water.

3. The aqueous preparation of claim 1, wherein the aqueous preparation contains from 10 to 75% by weight of setting accelerators and cationically stabilized polymers, based on the total weight of the aqueous preparation.

4. The aqueous preparation of claim 1, wherein the weight ratio of cationically stabilized polymers to setting accelerators is from 5:1 to 1:5, based on the dry weight of the aqueous preparation.

5. The aqueous preparation of claim 1, wherein the polymer having the cationic charge consists of 20 to 100% by weight of cationic monomer units, based on the total weight of the cationic protective colloid, and optionally nonionic monomer units selected from the group consisting of vinyl esters having from 1 to 15 carbon atoms in the carboxylic acid radical, acrylamide, hydroxyethyl (meth)acrylate, hydroxypropyl (meth)acrylate, esters of methacrylic acid and acrylic acid with alcohols having from 4 to 13 carbon atoms, polyalkylene glycol (meth)acrylates having $C_2$-$C_4$-alkylene units and molecular weights of from 350 to 2000 g/mol, N-vinylpyrrolidone, N-vinylcaprolactam, acryloxypropyltrialkoxysilanes, methacryloxypropyltrialkoxysilanes, vinyltrialkoxysilanes, vinylmethyldialkoxysilanes and mixtures of any of these.

6. The process of claim 2, wherein the aqueous preparation contains from 10 to 75% by weight of setting accelerators and cationically stabilized polymers, based on the total weight of the aqueous preparation.

7. The process of claim 2, wherein the weight ratio of cationically stabilized polymers to setting accelerators is from 5:1 to 1:5, based on the dry weight of the aqueous preparation.

8. The process of claim 2, wherein the polymer having the cationic charge consists of 20 to 100% by weight of cationic monomer units, based on the total weight of the cationic protective colloid, and optionally nonionic monomer units selected from the group consisting of vinyl esters having from 1 to 15 carbon atoms in the carboxylic acid radical, acrylamide, hydroxyethyl (meth)acrylate, hydroxypropyl (meth)acrylate, esters of methacrylic acid and acrylic acid with alcohols having from 4 to 13 carbon atoms, polyalkylene glycol (meth)acrylates having $C_2$-$C_4$-alkylene units and molecular weights of from 350 to 2000 g/mol, N-vinylpyrrolidone, N-vinylcaprolactam, acryloxypropyltrialkoxysilanes, methacryloxypropyltrialkoxysilanes, vinyltrialkoxysilanes, vinylmethyldialkoxysilanes and mixtures of any of these.

9. The process of claim 2, wherein the setting accelerator is one of aluminum compounds, silicates or alkali carbonates.

10. The process of claim 2, wherein the setting accelerator is one of aluminum salts or aluminates.

11. The process of claim 2, wherein the polymers of ethylenically unsaturated monomers are based on monomers selected from the group consisting of vinyl acetate, vinyl propionate, vinyl butyrate, vinyl 2-ethylhexanoate, vinyl laurate, 1-methylvinyl acetate, vinyl pivalate, vinyl esters of alpha-branched monocarboxylic acids having from 9 to 13 carbon atoms, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate, ethylene, propylene, 1,3-butadiene, styrene, vinyltoluene and vinyl chloride.

12. The aqueous preparation of claim 1, wherein the setting accelerator is one of aluminum compounds, silicates or alkali carbonates.

13. The aqueous preparation of claim 1, wherein the setting accelerator is one of aluminum salts or aluminates.

14. The aqueous preparation of claim 1, wherein the polymers of ethylenically unsaturated monomers are based on monomers selected from the group consisting of vinyl acetate, vinyl propionate, vinyl butyrate, vinyl 2-ethylhexanoate, vinyl laurate, 1-methylvinyl acetate, vinyl pivalate, vinyl esters of alpha-branched monocarboxylic acids having from 9 to 13 carbon atoms, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate, ethylene, propylene, 1,3-butadiene, styrene, vinyltoluene and vinyl chloride.

15. The process of claim 2, further comprising mixing aqueous dispersions of the polymers of ethylenically unsaturated monomers with cationic protective colloids.

16. Aqueous preparations of polymer-modified setting accelerators obtained from the process of claim 15.

* * * * *